Sept. 5, 1950          E. R. BURN          2,521,339
AIRCRAFT SEAT
Filed July 31, 1945
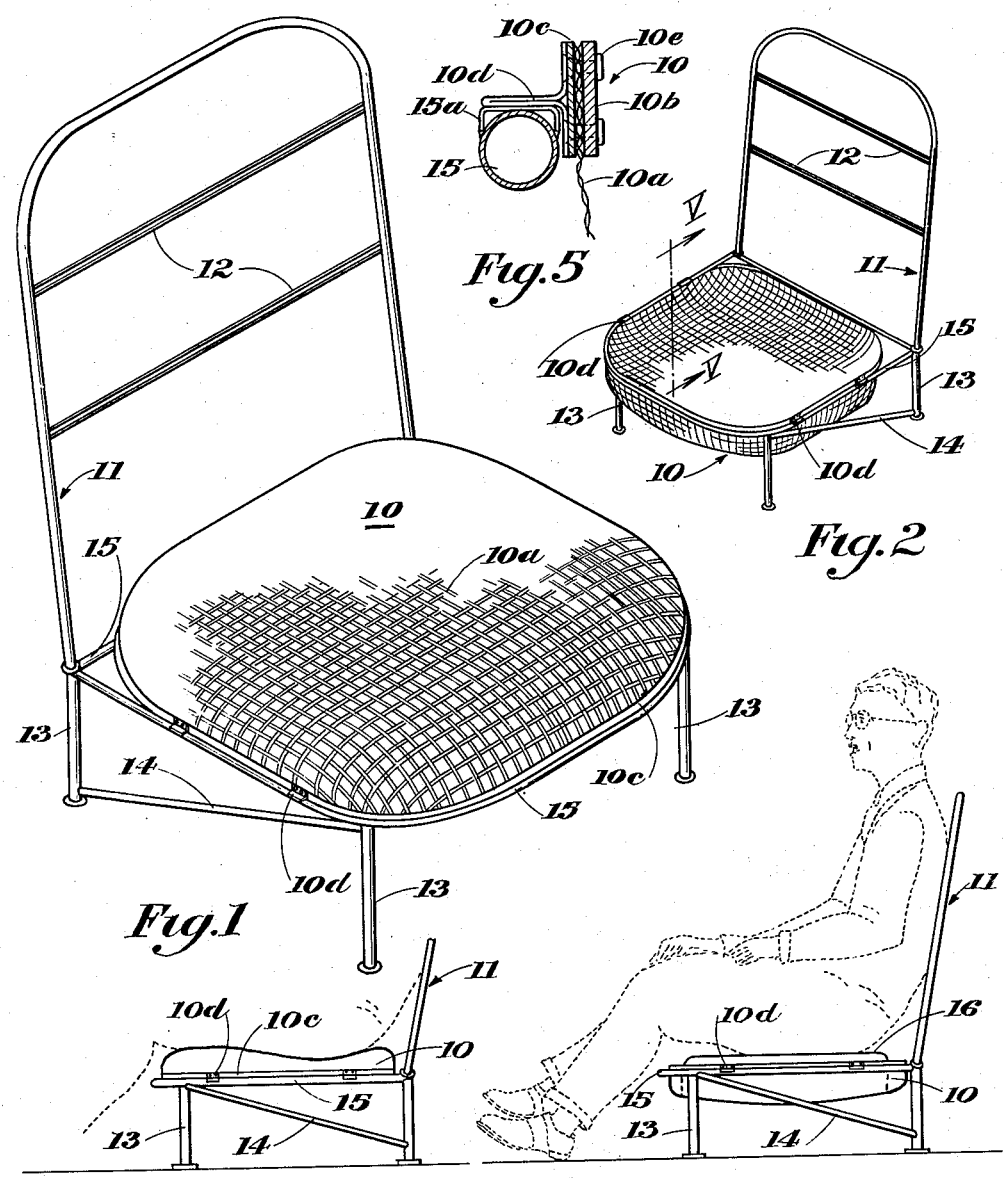
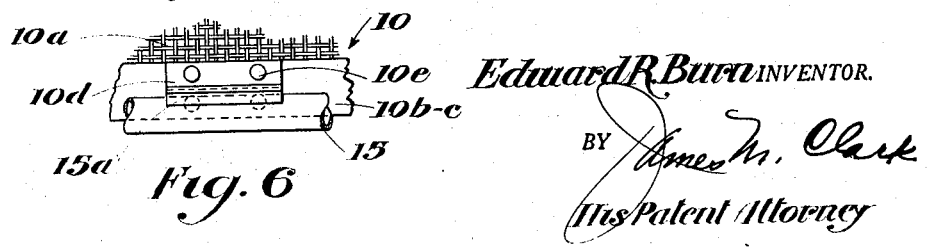
Edward R. Burn INVENTOR.
BY James M. Clark
His Patent Attorney Patented Sept. 5, 1950

2,521,339

UNITED STATES PATENT OFFICE 2,521,339

AIRCRAFT SEAT

Edward R. Burn, Cuyahoga Falls, Ohio, assignor to Aeronca Aircraft Corporation, a corporation of Ohio Application July 31, 1945, Serial No. 607,984

8 Claims. (Cl. 155—183)

This invention relates to seats and chairs, and more particularly to aircraft seats adapted for ready conversion for occupants with and without seat type parachutes.

It is customary in certain type aircraft to provide parachutes of the seat or pack type for the pilots and the passengers. In this type parachute the occupant wears or carries the harness of the parachute about his body with the parachute pack suspended therefrom and in becoming seated within the aircraft the wearer sits upon the parachute pack. Inasmuch as the parachute pack has appreciable thickness, the occupant will sit either at elevated or depressed levels depending upon whether or not he sits upon the parachute pack upon any given seat which is fixed as to its height above the floor.

The present invention is directed to an improved convertible chair or seat which is particularly adapted for use in aircraft for occupants wearing seat type parachutes and comprises essentially a formed wire mesh seat cushion invertibly supported upon the chair or seat frame. By means of the present seat and the improved cushion having a normally outwardly bulged surface for use by an occupant without the seat pack, and a recessed under-portion adapted to receive the seat pack, the occupant is able to sit at substantially the same elevation with a seat pack as he does without the seat pack upon the normally upward facing seat cushion. Heretofore it has been necessary to provide mechanical or other adjusting means to elevate or depress the aircraft chair or seat to accommodate the occupant with or without the seat type pack. The present invention accordingly eliminates the necessity for any mechanical adjusting mechanism with its increased weight and cost and accomplishes an improved result in a much simpler and more expeditious manner.

It is accordingly a major object of the present invention to provide an improved airplane seat or chair cushion which is invertible to accommodate an occupant wearing a seat type parachute pack and to maintain his sitting level the same as without the pack. It is a further object to provide an aircraft seat which is simple and cheap in construction and by virtue of its readily invertible seat cushion accomplishes the results of prior adjustable and more expensive seats. Other objects and advantages of the present invention will become apparent to those skilled in the art after reading the present specification and the accompanying drawings forming a part hereof, in which:

Fig. 1 is a perspective view of an aircraft seat provided with a cushion of the improved type;

Fig. 2 is a perspective view to a smaller scale of the same seat frame of Fig. 1 with its cushion inverted to receive a seat type parachute pack;

Fig. 3 is a side elevation of the seat of Fig. 2 with a seat type pack disposed within the inverted cushion for a parachute wearing occupant;

Fig. 4 is a fragmentary view of the same chair with the cushion in its normal position for use by an occupant without a seat type parachute;

Fig. 5 is an enlarged detail view of the seat frame and inverted cushion as taken along the lines V—V of Fig. 2; and Fig. 6 is a side elevational view to an enlarged scale of the cushion support means in its relationship as it appears in Figs. 1 and 4.

Referring now to Fig. 1, the improved cushion is indicated by the numeral 10 and the chair frame indicated as 11 having a back portion 12, a plurality of legs 13, diagonally braced by 14, and a substantially horizontal support frame portion 15. The cushion 10 is preferably formed of wire mesh or caning 10a to provide a resiliently comfortable cushion while disposed in its normal position as shown in Fig. 1. When inverted into its position of Figs. 2 and 3, it forms a basket or recessed pan in which the wire mesh is of lesser resilience in supporting an occupant's weight, but in which the cushion effect is provided by the inserted parachute pack 16 of Fig. 3. The cushion 10 and its wire mesh body 10a is provided with a frame or edging formed by the flat strips 10b and 10c which intermediately clamp the wire mesh 10a and form a support for the lug or protruding portions 10d. These lugs are also formed of flat or sheet material bent into a T-form having its flanged portions attached to the frame 10b—10c, as by the rivets 10c, and having its stem portion extending outwardly in a horizontal direction. The supporting portion 15 of the seat frame 11 is preferably provided at properly spaced intervals beneath the locations of the lugs 10d with a plurality of inverted U-shaped bearing portions 15a preferably welded to the tube 15 as clearly shown in Figs. 5 and 6.

Referring to Fig. 5 which shows the cushion in its inverted attitude, it will be apparent that the cushion can be readily lifted out and inverted by having the lugs 10d contact and be supported upon the frame bearing portions 15a. And also, that in either position the frame 10b—10c of the cushion extends a like distance above and below the stem of the lug portion and the frame and cushion is accordingly prevented from being readily displaced from the chair frame due to movements of the occupant in any horizontal direction due to flight conditions or from other causes.

It will accordingly be noted from a comparison of the elevational views in Figs. 3 and 4 that the occupant, who is indicated by the dotted lines in Fig. 3 sits at about the same elevation upon the parachute pack 15 supported within the inverted cushion 10 as the same occupant would sit upon the normally disposed cushion 10 in Fig. 4 in which the occupant does not wear a seat type parachute. Accordingly for an occupant of the same size or height the improved unitary cushion of the present invention permits him to sit at precisely the same level within the airplane or other vehicle regardless of whether he wears a parachute or not. Other forms and modifications of the present invention both with respect to its general arrangement and its respective details which may become apparent to those skilled in the art after reading the present specification are intended to fall within the scope and embrace of this invention as more particularly defined in the appended claims.

I claim:

1. In an aircraft seat, a substantially horizontal supporting frame portion, a convertible seat portion having a normally upward-facing convex cushion face and a normally downwardly-facing concave face, supporting means including protruding portions carried by said seat portion engageable with said substantially horizontal supporting frame portion in both normal and inverted positions of said seat portion arranged to provide a seat for the support of an occupant in said normal position and to receive a seat type parachute-pack within its concave face in its inverted position for the support of an occupant thereon at the same height as said normal position.

2. A convertible aircraft seat comprising a substantially horizontal supporting frame portion, a reversible seat portion having a normally upward bulged face arranged for support upon said substantially horizontal supporting frame portion, said seat portion having a recessed opposite face, and supporting means including protruding portions upon said seat portion asymmetrically disposed with respect to said faces arranged to provide a given height for said seat portion in its normal position and to provide the same normal height for a parachute-pack wearing occupant in its inverted position in which the parachute-pack occupies said recessed opposite face.

3. An aircraft parachute-pack seat having a fixed substantially horizontal supporting framework portion defining an opening therein, a normally upwardly facing convex seat portion for the support of an occupant at a given height, said seat portion having a recessed underside, and invertible support means including protruding portions carried by said seat portion engageable with said substantially horizontal supporting framework portion adjacent the edges of the opening therein in such manner that said seat portion may be invertibly installed within said opening to receive within its recessed underside a parachute-pack for the support of an occupant thereon at said same normal height.

4. In an aircraft seat a fixed supporting framework portion having an opening therein, a concavo-convex faced seat portion and supporting means including protruding lug portions carried by said seat portion asymmetrically disposed with respect to the faces of said seat portion for selective invertible engagement within the opening in said supporting framework portion, the convex face of said seat portion arranged to normally support an occupant at a predetermined height and the concave face of said seat portion arranged to support in the inverted position a parachute-wearing occupant at said same predetermined height.

5. A convertible cushion for an aircraft seat having a fixed substantially horizontal supporting framework portion defining an opening therein, said cushion comprising a peripheral frame, a wire mesh member attached to said frame providing a resilient convex face for the normal support of an occupant at a predetermined height, said wire mesh member provided with an inverted concave face, and invertible support means including protruding portions attached to said cushion frame arranged to invertibly engage said substantially horizontal supporting framework portion within said opening with its concave face upward for the support of a parachute-pack and an occupant thereon at said same predetermined height as in its normal position.

6. A convertible aircraft seat comprising a fixed framework, a cushion having a normally upward facing convex body portion and a recessed underportion, supporting lugs attached to said cushion portion for selective invertible engagement with said seat framework in either its normal or inverted position whereby a parachute-pack is adapted to be supported within the recessed underportion of said inverted cushion for occupancy at an elevation substantially the same as that provided by the convex body portion of said cushion in its normally upward facing position.

7. An aircraft seat comprising a substantially horizontal supporting frame portion and a convex face cushion seat having an opposite concave face, said cushion seat having a plurality of protruding portions, said substantially horizontal supporting frame portion arranged to support said cushion seat with its convex face upward for the support of a non-parachute-pack wearing occupant at a normal height and to support within its inverted concave face the parachute-pack of an occupant for his support at said same normal height.

8. An aircraft seat as set forth in claim 7 characterized by the said cushion seat being formed of caning providing a resiliently compressible cushion in its normal position and forming a tensioned recessed pan of lesser resilience in its inverted parachute-pack supporting position.

EDWARD R. BURN.

REFERENCES CITED

The following references are of record in the file of this patent:

UNITED STATES PATENTS

| Number | Name | Date |
| --- | --- | --- |
| 318,296 | Ritchie | May 19, 1885 |

FOREIGN PATENTS

| Number | Country | Date |
| --- | --- | --- |
| 4,418 | Great Britain | Mar. 24, 1887 |
| 17,273 | Great Britain | Aug. 26, 1905 |
| 311,933 | Great Britain | Mar. 23, 1929 |